No. 759,196. PATENTED MAY 3, 1904.
E. C. SHAW.
HORIZONTAL VULCANIZING PRESS.
APPLICATION FILED OCT. 21, 1903.
NO MODEL. 2 SHEETS—SHEET 1.
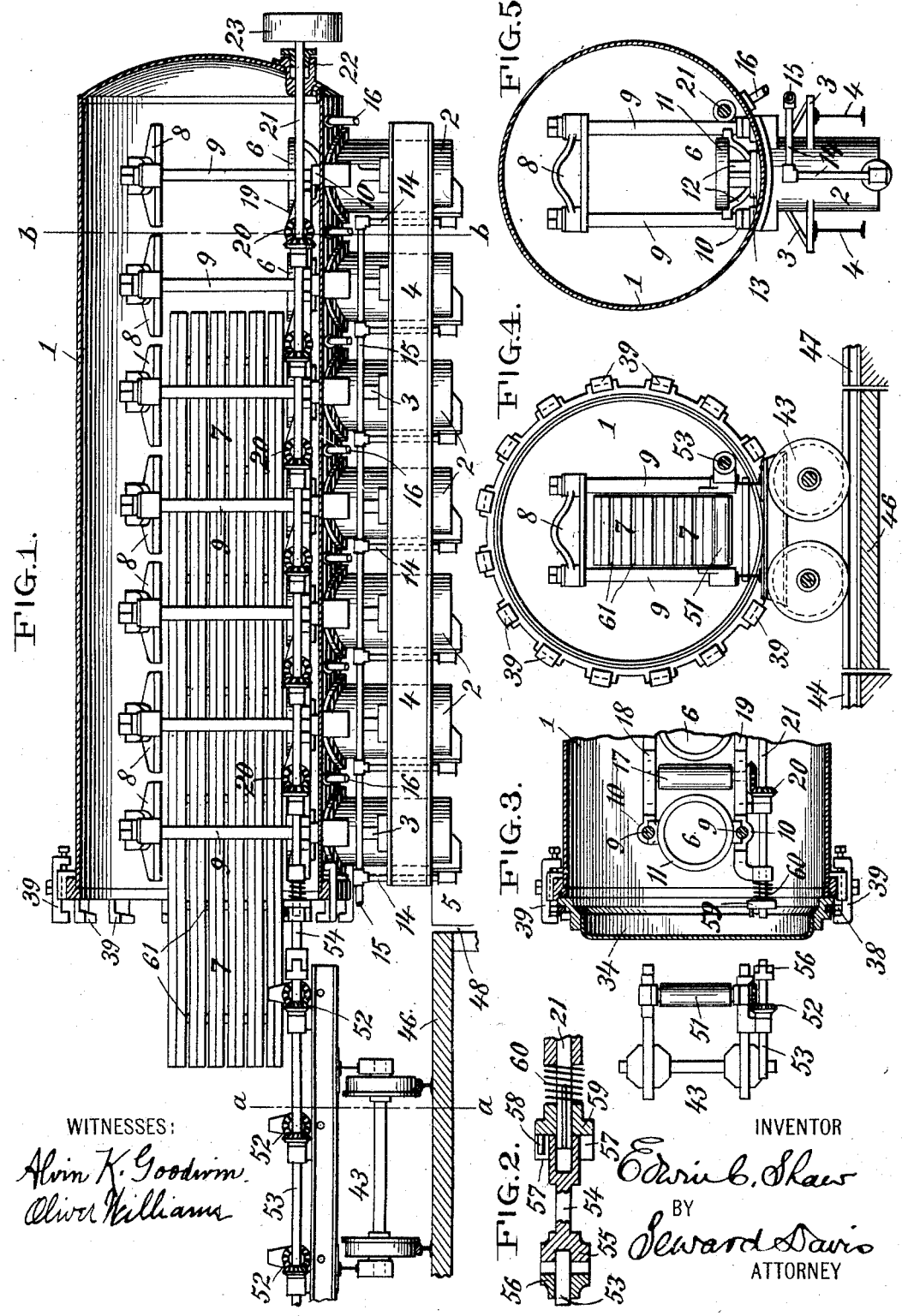
WITNESSES:
Alvin K. Goodwin
Oliver Williams
INVENTOR
Edwin C. Shaw
BY
Seward Davis
ATTORNEY No. 759,196. PATENTED MAY 3, 1904.
E. C. SHAW.
HORIZONTAL VULCANIZING PRESS.
APPLICATION FILED OCT. 21, 1903.
NO MODEL. 2 SHEETS—SHEET 2.
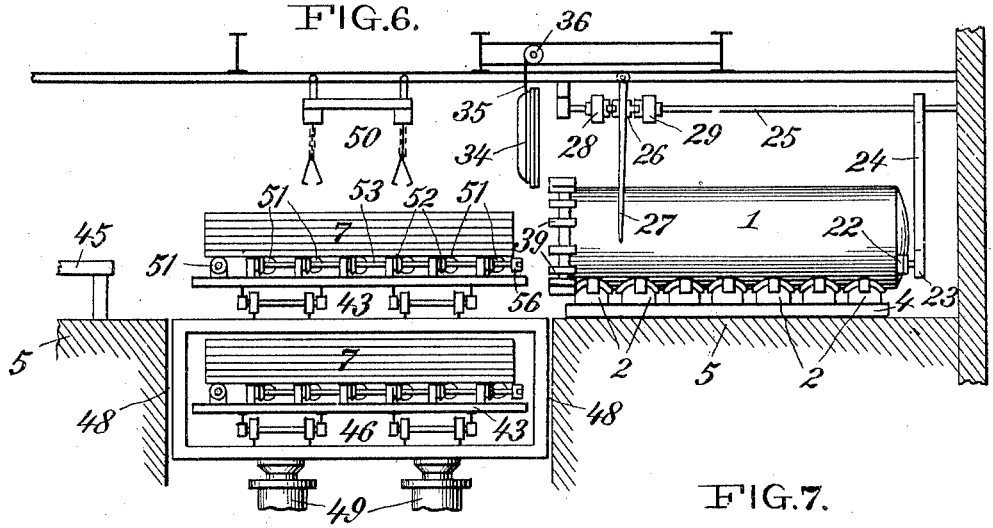
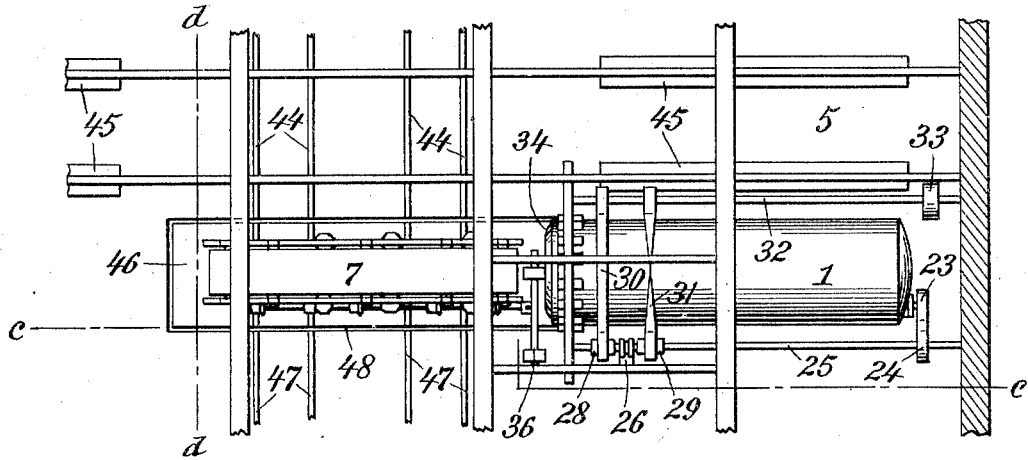
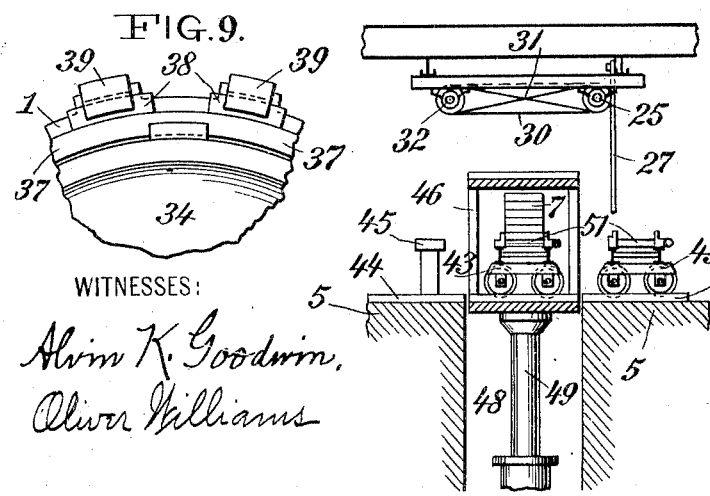
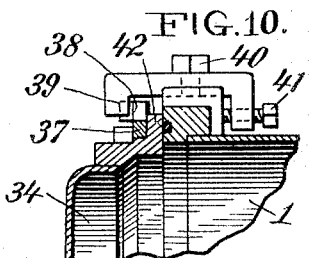
WITNESSES:
Alvin K. Goodwin,
Oliver Williams
INVENTOR
Edwin C. Shaw
BY
Seward Davis
ATTORNEY No. 759,196. Patented May 3, 1904.

UNITED STATES PATENT OFFICE.

EDWIN COUPLAND SHAW, OF AKRON, OHIO, ASSIGNOR TO THE B. F. GOODRICH COMPANY OF OHIO, OF AKRON, OHIO, A CORPORATION OF OHIO.

HORIZONTAL VULCANIZING-PRESS.

SPECIFICATION forming part of Letters Patent No. 759,196, dated May 3, 1904.

Original application filed June 17, 1903, Serial No. 161,887. Divided and this application filed October 21, 1903. Serial No. 177,925. (No model.)

*To all whom it may concern:*

Be it known that I, EDWIN COUPLAND SHAW, a citizen of the United States of America, residing at the city of Akron, county of Summit, and State of Ohio, have invented certain new and useful Improvements in Horizontal Vulcanizing-Presses, of which the following is a specification.

This invention relates to an improved horizontally-disposed vulcanizing-press and means for charging molds into it and discharging them therefrom.

The invention is designed more particularly for use in vulcanizing vehicle-wheel tires made in straight lengths of about fifteen feet and requiring use of heavy metal molds of about the same length; but no restriction to such use is intended to be implied, as the invention in some of its features may with advantage be otherwise employed in the rubber-vulcanizing art.

More particularly the invention has for its object to provide a horizontal vulcanizing-press of simple construction which may be operated almost continuously with economy of time, labor, and fuel to vulcanize unusually large charges of tires or rubber products in the molds while improving the quality of the cure and of the vulcanized-rubber product.

The invention includes a horizontal vulcanizer having interior means adapted automatically to transfer molds into and out of it and interior means adapted to subject the molds to pressure to hold them closed. Such pressure is preferably that of fluid-operated rams which clamp a single mold or a series of stacked molds with a pressure-compensating change in mass of rubber products in the mold or molds during vulcanization, thus assuring constant proper closure of the molds without requiring time-consuming and expensive bolting together of their halves or parts and also avoiding breaking or buckling of the expensive molds.

The invention also includes the combination, with the horizontal vulcanizer, of one or more mold-cars having means for automatically propelling their loads of molds and adapted for coupling by detachable devices with the mold-transferring means of the vulcanizer. A charge of newly-prepared molds brought to the vulcanizer by a car thus may be automatically transferred from the car to the vulcanizer and be properly arranged therein to permit quick closing and locking of the suspended vulcanizer-door and to allow introduction of steam or other medium to effect speedy, even, and thorough vulcanization of the rubber products in the compressed molds. After vulcanization is assured and the molds are unclamped the press-door is opened, and the molds are automatically discharged from the press upon a car by coöperation of the mold-moving mechanism of the press and car. The invention also includes means for operating this mold-moving mechanism and further includes various combinations of parts and details of construction, all as hereinafter described, and particularly defined in the appended claims.

Reference is made to the accompanying drawings, forming part of this specification, in which—

Figure 1 is a longitudinal vertical sectional view of the vulcanizing-press and portions of a mold-car and an elevator preferably used with the cars, the charge of molds being shown as moved forward nearly into the press. Fig. 2 is an enlarged detail sectional view of a preferred grab-coupling as engaged with end portions of the roller-carrier shafts of the press and mold-car. Fig. 3 is a detail sectional plan view of the door-closed end of the press and the adjacent end of a mold-car, the grab-coupling being removed. Fig. 4 is a vertical section of the mold-car and the elevator, taken on the line $a\ a$ in Fig. 1, the press and its charge of molds being shown in end view. Fig. 5 is a detail transverse vertical sectional elevation taken through the press on the line $b\ b$ in Fig. 1. Fig. 6 is a longitudinal vertical sectional view drawn to a reduced scale and taken on the line $c\ c$ in Fig. 7 and shows the general arrangement of the vulcanizing-press and mold-cars in their preferred relation with other portions of a complete molding plant. Fig. 7 is a plan view of the apparatus shown in Fig. 6. Fig. 8 is a vertical sectional view taken on the line $d$ $d$ in Fig. 7, but with the elevator raised and having a mold-loaded car on its lower deck and with an empty car standing on the extension-rails beside the elevator; and Figs. 9 and 10 are respectively enlarged detail front and sectional side views showing the preferred vulcanizer-door fastenings.

The mold-car elevator, the cooling-pit into which the mold-loaded cars are lowered to cool the molds just discharged upon the car from the vulcanizer, the mold-preparing tables, and the traveling hoists by which the molds are transferred between the tables and cars are shown more or less fully in the drawings and are herein briefly mentioned in order to give a clearer idea of the coöperative relation with them of the vulcanizing-press and mold-cars forming the special subject-matter of this patent application, which is a division of my prior patent application having Serial No. 161,887, which generally includes all the above-named portions of a complete rubber molding and vulcanizing plant.

The body or vulcanizing-chamber 1 of the press may be sustained level horizontally in any approved manner; but I have specially arranged for supporting it by the cylinders 2 of a series of hydraulic presses, which are sustained by brackets 3 of the cylinders resting on metal beams 4, laid on the cement or masonry floor 5 of a factory-building. The several hydraulic-press rams preferably have skeleton heads 6, which permit free steam circulation through them and compress rubber-filled molds 7 between them and opposing resistance-heads 8, which are fixed to the tops of metal posts 9, secured in heavy metal foot-blocks 10 on the press-cylinders. I prefer to make each skeleton ram-head 6 with a top ring 11 and a series of four brackets 12, connecting the ring to a base-plate 13, which is fixed to the top of the press-ram. Two of the brackets 12 are extended laterally to fit loosely on the two posts 9 of each press for guiding vertical movement of its ram. Pipes 14 form water-inlets to the press cylinders and rams, and the pipes 14 of all the cylinders connect with a common water-supply pipe 15. A series of pipes 16 admit steam to the vulcanizer for heating the molds 7 charged therein. The pipes 16 preferably connect with a common steam-supply pipe. (Not shown in the drawings.) The press-body will be fitted with the usual steam-gage and thermometer, which it is not necessary to show or describe.

The vulcanizing-press may have any approved means or mechanism for automatically transferring a charge of one or more molds 7 into and out of it from and to mold-cars presently described. A preferred mold-transfer-ring means for the press comprises a series of rollers 17, which are journaled in opposite metal side frames 18 19, with which connect the foot-blocks 10 of the press-posts 9. Hence the parts 10 18 19 mutually brace each other lengthwise of the press. The mold-transfer-ring rollers 17 are arranged between the successive hydraulic-ram heads 6, and the upper faces of the rollers normally stand a little above the tops of the fully-lowered rams to prevent contact with the rams of the moving load of molds. Any suitable mechanism may be used to rotate the whole series of rollers 17 or alternate rollers in unison either forward or backward. For this purpose I prefer to provide bevel-gearing 20, comprising a bevel gear-wheel on one end of each roller meshing with a bevel gear-wheel on a shaft 21, journaled in bearings provided on the side frame 19. This shaft 21 extends through a stuffing-box 22 at the closed rear end of the press and carries a pulley 23, which when rotated by a belt 24 in opposite directions will, through the bevel-gearing 20, rotate all the rollers 17 forward or backward to transfer or charge a load of molds 7 into the press from a mold-car or to discharge the molds from the press upon a car which has coöperating mold-propelling mechanism hereinafter described. Any means for reversing direction of rotation of the pulley 23 by the belt 24 may be adopted. I show said belt running on a pulley fixed to an overhead counter-shaft 25, to which is splined a double clutch 26, coupled to a shipper 27, which may be moved to engage said clutch with either one of two clutch-pulleys 28 29, loose on the shaft 25 and from which pulleys, respectively, a straight belt 30 and a crossed belt 31 pass to pulleys fixed on a main driving-shaft 32, carrying a pulley 33, over which a belt will run from a power-transmitting pulley. (Not shown in the drawings.)

I have specially arranged the removable end door 34 of the vulcanizing-press for suspension by a cable or chain 35 from an overhead pulley-hoist 36, operative to permit raising of the unlocked door clear above the open end of the vulcanizer to permit discharge of the molds from the press and also allowing the heavy door to be lowered easily and quickly into position for closing the mold-charged press. I prefer to provide the door with locking devices comprising a revoluble ring 37, having a spaced series of lugs 38, provided with wedging-surfaces adapted to interlock with wedging-surfaces of a corresponding series of spaced lugs 39, held to the vulcanizer-body 1 by bolts 40 and having set-screws 41, by which the lugs 39 and their wedging-surfaces may be adjusted accurately to cause like even engagement of the opposed locking wedging-surfaces all around the door to assure tight closing of the door against a packing-ring 42, inserted at the end of the vulcanizer-body. The door is unlocked and released from the vulcanizer by turning the ring 37 sufficiently in one direction to carry its lugs 38 out of register with the vulcanizer-lugs 39, thus permitting the door to swing away from the press-body on the chain 35 and allowing the raising of the door clear above the vulcanizer by operating the hoist 36 by hand or otherwise. The locking wedge-ring on the door as combined with the spaced locking wedge-lugs on the vulcanizer are not specially claimed herein, as they are described and claimed in my companion patent application, having Serial No. 161,885.

The mold-cars 43 preferably have two trucks arranged to allow the cars to run laterally on two pairs of rails 44, arranged between tables 45, on which the molds are cleaned and filled with rubber stock. These rails are preferably extended across the two decks of a double-decked elevator 46 and beyond the elevator at 47. This elevator may be operated in the mold-cooling pit 48 by hydraulic rams 49 or otherwise. The rubber-filled molds 7 are taken from the tables 45 and are loaded upon the cars by suitable overhead traveling-hoist apparatus 50, which also return the molds from the cars to the tables.

The mold-cars 43 may have any approved means or mechanism adapted to propel their loads of molds forward and backward. For this purpose I prefer to use a series of rollers 51, journaled in the opposite side frames of the car. These rollers, like those 17 of the vulcanizing-press, constitute a roller-carrier for the molds. All of the car-rollers 51, possibly excepting the last one of the series, or it can be the alternate rollers, are operated simultaneously by bevel-gearing 52, comprising a bevel gear-wheel on the roller meshing with a like gear-wheel on a shaft 53, which is journaled to and along one side of the car-frame.

To assure operation in unison of the roller-carriers of the car and vulcanizing-press when the press-door 34 is removed, I have provided detachable coupling devices, preferably comprising a grab-coupling 54, which has a rear clutch-head 55, adapted to engage a clutch member 56 on the forward end of the car-shaft 53. At its forward end the coupling 54 has a bored head provided with one or more radial ribs 57, adapted to be engaged by a pin 58 on a clutch member 59, which is splined to the press roller-carrier shaft 51 and is normally forced outward by a spring 60, placed behind it on the shaft.

The operation of this apparatus is as follows: Let it be supposed that six rubber-filled molds 7 have been taken from the preparing-tables 45 and have been loaded in a stack upon a car 43 by the traveling hoists 50 and preferably with spacing-bars 61 arranged between the molds to give free circulation all around the molds. This mold-loaded car is run along the rails 44 and upon the elevator 46, if the latter be used, and directly in front of the vulcanizing-press, the door 34 of which is lifted by the hoist 35 36, as shown in Fig. 6 of the drawings. The grab-coupling 54 now is engaged by its forward head having the ribs 57 with the press-shaft coupling 58 59, which is then forced inward on the press-shaft 21 against the tension of the spring 60 until the rear coupling member 55 is engaged with the head 56 on the car-shaft 53, and on releasing the grab-coupling it will be held securely in place by the spring 60 to assure simultaneous rotation of the press-shaft 21, the car-shaft 53, and the roller-carriers 17 51 of the vulcanizing-press and the car. By now adjuting the shipper 27 to engage the clutch 26 with the counter-shaft pulley 28 the driving-shaft 32 and the straight belt 30 will rotate the countershaft 25, and consequently the rollers 17 51, in direction to automatically propel or transfer the load of molds bodily forward from the car 43 into the press and, as will be understood from Fig. 1 of the drawings, which shows the molds moved most of the way forward into the press. When the press-rollers carry the molds fully forward to final position within the press, the clutch 26 and pulley 28 will be disengaged to allow the stack of molds to rest upon the rollers 17. The grab-coupling 54 now is quickly removed by first forcing it forward as the spring 60 yields and then disengaging the rear clutch member 55 56 and finally withdrawing the forward head from the press-shaft-coupling member 59. The press-door now is quickly lowered by the hoist 35 36, and the door-ring 37 will be rotated to engage its wedging-faces 38 behind the press wedging-faces 39 to lock the door tightly closed. Either before or after the door thus is closed and locked water is admitted through the pipes 15 14 to raise the entire series of press-rams and their heads 6, and thereby lift the stack of molds 7 from the press-rollers 17 and clamp the molds between the ram-heads 6 and the opposing heads 8 to hold them closed with a pressure-compensating change in mass of the rubber products in the molds during vulcanization. Steam is now admitted to the closed press through the pipes 16 and circulates freely around all the molds 7 to vulcanize their contents. When vulcanization is effected, the steam is shut off and the vulcanizer-door 34 is unlocked and released by turning its ring 37 in reverse direction, and the door is then lifted by the hoist 35 36, and about at the same time water-pressure is taken from the rams to allow them to fall and again lower the charge of molds upon the press-roller-carrier 17 ready for discharge of the molds from the press. This is done by engaging the grab-coupling 54 with the roller-carrier shafts 21 53 of the press and a car 43 standing in front of it and engaging the clutch 26 by the shipper 27 with the other pulley 29 on the shaft 25, thereby rotating the latter by the crossed belt 31 in reverse direction to that above mentioned and causing simultaneous backward rotation of the roller-carriers 17 51 of the press and car to automatically transfer the load of hot molds from the press to the car. The clutch 26 now is disengaged from the pulley 29, and the grab-coupling 54 is removed and the car-load of molds may be run off on the rails to give room to another car-load of newly-prepared molds to be automatically charged into the vulcanizing-press by the coupled roller-carriers of the car and press, substantially as above described.

In the preferred sequence of operations the hot molds are discharged from the vulcanizer upon a car 43, standing on the lower deck of the elevator 46, and the elevator then is lowered to carry the car-load of hot molds bodily into the cooling-pit 48 to quickly and evenly cool the molds, and while the elevator is down another car 43, which had been moved over upon the extension-rails 47 after it had charged the above-named load of molds into the press, is run back across the top deck of the elevator and along the rails 44 to conveniently receive from the traveling hoists 50 the next load of prepared molds ready for charging them into the vulcanizer. One car-load of newly-prepared molds is standing on the rails 44 ready to be run upon the top-deck rails of the elevator immediately the elevator is lowered to carry the preceding car-load of hot molds into the cooling-pit. Hence there is but very little delay in vulcanizing successive charges of molds, as but a few minutes need elapse between the opening of the press-door 34 to permit discharge of one series of hot molds upon one car and the closing of the door after charging another series of newly-prepared molds into the vulcanizer from another car. There consequently is very little waste of heat, as the vulcanizer cools but slightly during the brief time its door is open, and the vulcanizing of successive charges of tires or other rubber products in the molds may be nearly continuous, whereby a great saving of time, labor, and fuel is effected as compared with the operation of other apparatus of this general character. The operation of the vulcanizing-press and the mold-cars relatively to the elevator and cooling-pit is more fully described in my aforesaid concurrent patent application, Serial No. 161,887.

It is not new to subject dental flasks or molds to constant spring-pressure to hold them closed during vulcanization of their rubber contents by circulation of heat around the molds in a chamber; but this prior method is best adapted for vulcanizing rubber goods having small bulk, mass, or area and is not well adapted for economically and satisfactorily vulcanizing bulky or massive rubber stock, such as vehicle-wheel tires, made in straight lengths, as herein described, or made in annular form. Such massive stock has heretofore been vulcanized in molds the halves or parts of which are clamped together all around the margin by numerous bolts tightened only by considerable time-consuming, arduous, and expensive labor prior to placing the molds in a steam or heating chamber for vulcanizing their contents. Notwithstanding the care necessarily taken in thus tightening the molds by marginally-disposed bolts the internal pressures arising while curing massive rubber stock in such bolt-locked molds are at times sufficient to buckle or burst the heaviest molds, particularly at their central areas, which are distant more or less from the marginal clamping-bolts. It is common also to place molds containing massive rubber stock, such as vehicle-wheel tires, between closed steam-chambers and to compress said chambers and the intervening molds by hydraulic pressure; but this method of curing is not certain to assure uniform vulcanization of all parts of the rubber stock, because the heat is greater at the top and bottom of the molds than at their edges, which are exposed to the atmosphere. By my apparatus and method a stack of molds separated by cross-bars are placed within a vulcanizing-chamber and free circulation of heat is assured at and around practically all parts of the molds, while they are clamped for substantially their whole area by heavy pressure compensating change in mass of the rubber products in the molds during vulcanization. I thus am able always to obtain a perfectly and uniformly vulcanized rubber product without dangerous warping or bursting of even the largest molds and in very much less time and with far less labor than is usually required. After the proper pressure per square inch required for any given size or composition of tires or other rubber goods in the molds is calculated and the valve admitting water or fluid to the press-rams is set to obtain such pressure on the molds the rams automatically adjust themselves to compensate change in mass of the rubber contents of the molds during the entire vulcanizing process and without readjusting the valve or any other part of the apparatus.

Various modifications may be made by the skilled mechanic without departing from the spirit of the invention expressed in the appended claims.

I claim as my invention—

1. A horizontal vulcanizing-press sustained upon the cylinders of a series of press-rams working within the vulcanizing-chamber.

2. A horizontal vulcanizing-press sustained upon the cylinders of a series of press-rams, said rams having skeleton heads giving free circulation through them within the vulcanizing-chamber.

3. A horizontal vulcanizer having interior means adapted automatically to transfer molds into and out of it.

4. A horizontal vulcanizer having interior means adapted to automatically transfer molds into and out of it, and mechanism actuating said interior mold-transferring means from outside the vulcanizing-chamber.

5. A horizontal vulcanizer having an interior roller-carrier for the molds.

6. A horizontal vulcanizer having an interior roller-carrier for the molds, and mechanism simultaneously rotating the carrier-rollers either forward or backward.

7. A horizontal vulcanizer having an interior roller-carrier for the molds, a longitudinal shaft, and gearing coupling the shaft and carrier-rollers for rotating the rollers simultaneously either forward or backward.

8. A horizontal vulcanizing-press having interior means adapted to clamp molds with a pressure compensating change in mass of the rubber products undergoing vulcanization in the molds.

9. A horizontal vulcanizing-press having a series of hydraulic rams and opposing heads between which molds may be clamped within the vulcanizing-chamber with a pressure compensating change in mass of the rubber products undergoing vulcanization in the molds.

10. A horizontal vulcanizing-press having interior means adapted to automatically transfer molds into and out of it, and also having interior means adapted to clamp molds with a pressure compensating change in mass of the rubber products undergoing vulcanization in the molds.

11. A horizontal vulcanizing-press having an interior roller-carrier for the molds and also having interior means adapted to clamp molds moved into the vulcanizing-chamber by the roller-carrier.

12. A horizontal vulcanizing-press having an interior roller-carrier for the molds, mechanism simultaneously rotating the carrier-rollers either forward or backward, and interior means adapted to clamp molds moved into the vulcanizing-chamber by the roller-carrier.

13. A horizontal vulcanizing-press having an interior roller-carrier for the molds, a longitudinal shaft, gearing coupling the shaft and carrier-rollers for rotating the rollers simultaneously either forward or backward and interior means adapted to clamp molds moved into the vulcanizing-chamber by the roller-carrier.

14. A horizontal vulcanizing-press having an interior roller-carrier for the molds, and also having a series of hydraulic rams and opposing heads between which molds may be clamped within the vulcanizing-chamber with a pressure compensating change in mass of the rubber products undergoing vulcanization in the molds.

15. A horizontal vulcanizing-press having an interior roller-carrier for the molds, mechanism simultaneously rotating the carrier-rollers forward or backward, and a series of hydraulic rams and opposing heads between which molds moved into the press by the roller-carrier may be clamped within the vulcanizing-chamber with a pressure compensating change in mass of the rubber products undergoing vulcanization in the molds.

16. A horizontal vulcanizing-press having an interior roller-carrier for the molds, a longitudinal shaft, gearing coupling the shaft and carrier-rollers for rotating the rollers simultaneously either forward or backward, and a series of hydraulic rams and opposing heads between which molds moved into the press by the roller-carrier may be clamped with a pressure compensating change in mass of the rubber products undergoing vulcanization in the molds.

17. A horizontal vulcanizer having at its open end a series of spaced wedging-lugs, and a door adapted to close the vulcanizer and having a revoluble locking-ring provided with a corresponding series of spaced wedging-lugs, combined with means suspending the door and permitting rotation of its ring for locking and unlocking the door, and also adapted to raise the unlocked door bodily to permit charging and discharging of the vulcanizer.

18. A horizontal vulcanizer having interior rollers 17, a shaft 21, and gearing 20 adapted to rotate the rollers simultaneously either forward or backward.

19. A horizontal vulcanizer having an interior roller-carrier for the molds including a shaft 21 operating the rollers and having a pulley 23, a counter-shaft 25 having a pulley belted to the roller-carrier-shaft pulley 23, and also having a double clutch and clutch-pulleys 28, 29; a driving-shaft 32, and a straight belt 30 and a crossed belt 31 connecting the clutch-pulleys 28—29 respectively with the pulleys on the driving-shaft.

20. A horizontal vulcanizer having an open end provided with spaced lugs carrying wedging-faces 39, a removable door 34 having a revoluble ring 37 provided with spaced lugs carrying wedging-faces 38 adapted to lock with and unlock from the vulcanizer lug-faces 39 when the ring is turned on the door, and a hoisting apparatus 35, 36 suspending the door and permitting locking and unlocking of it and also adapted to raise the door bodily to permit charging and discharging of the vulcanizer.

21. A horizontal vulcanizing-press having an interior series of rollers 17 and means adapted to rotate them forward and backward to serve as a roller-carrier for the molds, a series of skeleton ram-heads 6 arranged horizontally between the rollers, and resistance-heads 8 opposing the rams and providing for compressing between said parts 6, 8, a charge of molds moved into the press by and upon the roller-carrier.

EDWIN COUPLAND SHAW.

Witnesses:
WALTER A. FOLGER,
WILLIAM A. MEANS.